United States Patent [19] [11] Patent Number: 4,688,530
Nishikawa et al. [45] Date of Patent: Aug. 25, 1987

[54] CONTROL SYSTEM FOR ENGINE-OPERATED AUTOMOTIVE ACCESSORIES

[75] Inventors: Masao Nishikawa, Tokyo; Takashi Aoki, Saitama; Yoichi Sato, Saitama; Yukihiro Fukuda, Saitama, all of Japan

[73] Assignee: Honda Giken Kogyo Kabushiki Kaisha, Tokyo, Japan

[21] Appl. No.: 822,072

[22] Filed: Jan. 24, 1986

[30] Foreign Application Priority Data

Jan. 25, 1985 [JP] Japan .................................. 60-13236

[51] Int. Cl.$^4$ ............................................ F02B 77/00
[52] U.S. Cl. ................................ 123/198 R; 62/323.4; 62/133; 180/53.8
[58] Field of Search ....................... 123/198 R, 195 A; 62/323.4, 133; 180/53.7, 53.8, 132

[56] References Cited

U.S. PATENT DOCUMENTS 3,606,764 9/1971 Yokouchi et al. ............... 123/198 R
3,692,007 9/1972 Nilssen ............................. 123/198 R
4,155,225 5/1979 Upchurch ......................... 123/198 R
4,206,613 6/1980 Shockley ........................... 123/198 R
4,226,090 10/1980 Horian .............................. 123/198 R
4,280,457 7/1981 Bloxham ........................... 123/198 R
4,391,242 7/1983 Mashio .............................. 123/198 R
4,460,056 7/1984 Jaccod .............................. 123/198 R Primary Examiner—Ira S. Lazarus
Attorney, Agent, or Firm—Armstrong, Nikaido, Marmelstein & Kubovcik

[57] ABSTRACT

A control system for an accessory of an automobile includes an engine output detector for detecting the output of the engine of the automobile, a gear transmissioon coupled to the engine and responsive to detection of an idling condition of the automoboile for selecting a neutral gear position, an accessory such as an air conditioner compressor drivable by the engine, a clutch disposed between the accessory and the engine for applying and cutting off the output of the engine to the accessory, a speed sensor for detecting the speed of travel of the automobile, a control circuit for comparing an actual running condition of the automobile with a prescribed running condition in which the output of the engine and the speed of the automobile are lower than respective prescribed levels, and for inhibiting operation of the accessory by disconnecting the clutch when the automobile is under the prescribed running condition.

4 Claims, 7 Drawing Figures

CONTROL SYSTEM FOR ENGINE-OPERATED AUTOMOTIVE ACCESSORIES

BACKGROUND OF THE INVENTION

The present invention relates to a control system for controlling engine-operated accessories of an automobile.

Automobiles having automatic gear transmissions including fluid couplings such as torque converters are liable to move slowly in the forward direction, a phenomenon called "creep", due to a fluid drag when the automobile is stopped, unbraked, with the gear shift lever in the D range. The creep is undesirable since fuel economy upon engine idling is lowered and idling vibration is increased especially with front-engine front-drive automobiles.

There have heretofore been proposed and put to use many creep prevention devices which automatically place the gear transmission in the neutral position in response to detection of the idling running condition of the automobile.

The creep prevention device is generally arranged such that it will operate only in the low gear range to prevent engine braking from being impaired since the gear transmission is placed into the neutral position by the creep prevention device. Alternatively, the creep prevention device may be arranged to operate only when the automobile speed is lower than an extremetely low reference speed such as of 10 km/h.

This means that in the second gear range or higher gear ranges, or at automobile speeds higher than 10 km/h, the creep prevention device is not operated, and the engine braking is effective, allowing the engine torque from being transmitted to the drive wheels.

Various automotive accessories driven by the engine, such as an air conditioner compressor, consume a large amount of energy upon operation. Therefore, a device called an "opener" is added for increasing the throttle opening in synchronism with operation of the compressor. The opener is set to a relatively large opening in order to maintain a desired cooling capability. As a consequence, the idling speed of the engine at the time the compressor is in operation is higher than the idling speed when the compressor is at rest by a speed range from 100 to 200 rpm.

Therefore, even if the accelerator pedal is allowed back to the idling position in the second gear range or higher gear ranges, or at automobile speeds higher than 10 km/h, in which the creep prevention device is not operated, the creep-induced torque is increased by the operation of the compressor, making the automobile body vibrate to a greater extent.

While the automobile is being decelerated to a stop, the rotational speed of the drive wheels is initially high to enable the drive wheels to drive the engine (engine braking), and no large vibration is applied from the engine to the automobile body through the engine mount system. When the automobile speed is lowered and the automobile approaches a stop, the drive wheels are then driven by the engine, and the engine mount system is caused to flex, thereby transmitting vibration from the engine to the automobile body. With an automatic gear transmission having four forward gear positions, for example, such large vibration is induced immediately before gears are shifted from top to third gear positions, from third to second gear positions, and second to low gear positions. The vibration is largest in level at the time of a downshift from the second to low gear positions with a large gear ratio, and smallest in level at the time of a downshift from the top to third gear positions.

SUMMARY OF THE INVENTION

It is an object of the present invention is to provide a control system for automotive accessories such as an air conditioner compressor driven by an engine, which control system stops operation of the compressor to prevent vibration from being produced when the accelerator pedal is in the idling position and the speed of the automobile is sufficiently low while the automobile is in a running condition in which the engine torque is transmitted or the automobile is subject to creep, and which control system operates the compressor for a desired air-conditioning effect after the gear transmission is shifted down to a low gear position.

Another object of the present invention is to provide a control system for automotive accessories which has a control mechanism operable only when the automobile is decelerated.

Accordingly, it is an object of the present invention to provide a control system for an accessory of an automoble, comprising an engine, an engine output detector for detecting the output of the engine, a gear transmission coupled to the engine and responsive to detection of an idling condition of the automobile for selecting a neutral gear position, an accessory drivable by the engine, a clutch disposed between the accessory and the engine for connecting and disconnecting the output of the engine to the accessory, a speed sensor for detecting the speed of travel of the automobile, and control means for comparing an actual running condition of the automobile with a prescribed running condition in which the output of the engine and the speed of the automobile are lower than respective prescribed levels; and for inhibiting operation of the accessory by disconnecting the clutch when the automobile is under the prescribed running condition.

The above and further objects, details and advantages of the present invention will become apparent from the following detailed description of preferred embodiments thereof, when taken in conjunction with the accompanying drawings.

DETAILED DESCRIPTION OF THE PREFERRED EMBODIMENTS

Figure 1:
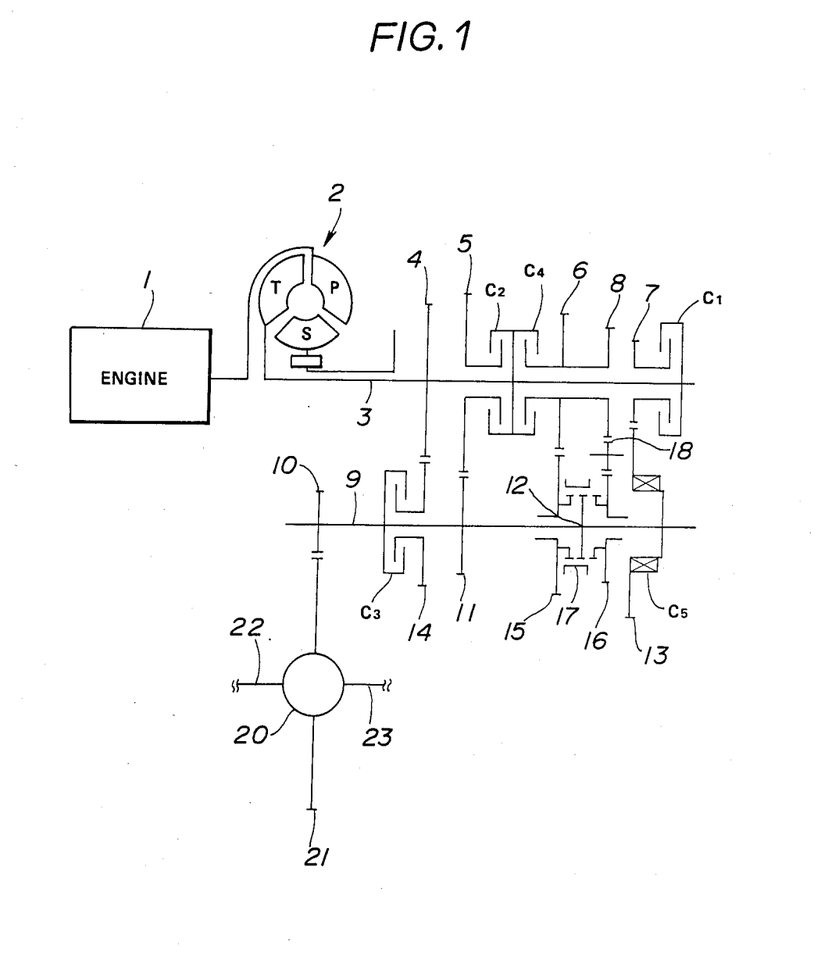
FIG. 1 is a schematic view of the power train of a torque-converter-type automatic gear transmission having four forward gear positions and a single reverse gear position.

FIG. 1 shows the power train of a torque-converter-type automatic gear transmission having four forward gear positions and one reverse gear position. The output torque from an engine 1 is tranmitted to the pump P of a torque converter 2, from which the output torque is hydrodynamically transmitted to the turbine T of the torque converter 2. As the torque is amplified between the pump P and the turbine T, its reactive force is borne by a stator S.

The tubine T is coupled to a main shaft 3 on which there are fixedly mounted a third driver gear 4, a second clutch $C_2$, a top clutch $C_4$, and a low clutch $C_1$, there are rotatably mounted a second driver gear 5, a top drive gear 6, and a low driver gear 7. A reverse driver gear 8 is integral with the top driver gear 6. On a countershaft 9 paralllel to the main shaft 3, there are fixedly mounted a final gear 10, a third clutch $C_3$, a second driven gear 11, splines 12, and a low driven gear 13, and there are rotatably mounted a third driven gear 14, a top driven gear 15, and a reverse driven gear 16. A selector sleeve 17 is disposed between the top and reverse driven gears 15, 16 for selective mesh therewith. A one-way clutch $C_5$ is interposed between the low driven gear 13 and the countershaft 9 for transmitting the torque only from the engine 1. An idle gear 18 is interposed in mesh between the reverse driver gear 8 and the reverse driven gear 16. The final gear 10 is in mesh with a differential gear 21 operatively coupled with wheels (not shown) through a differential 20 and drive axles 22, 23.

When the clutches $C_1$, $C_2$, $C_3$, $C_4$ are individually engaged, low, second, third, and top gear ratios are established, respectively.

Figure 2:
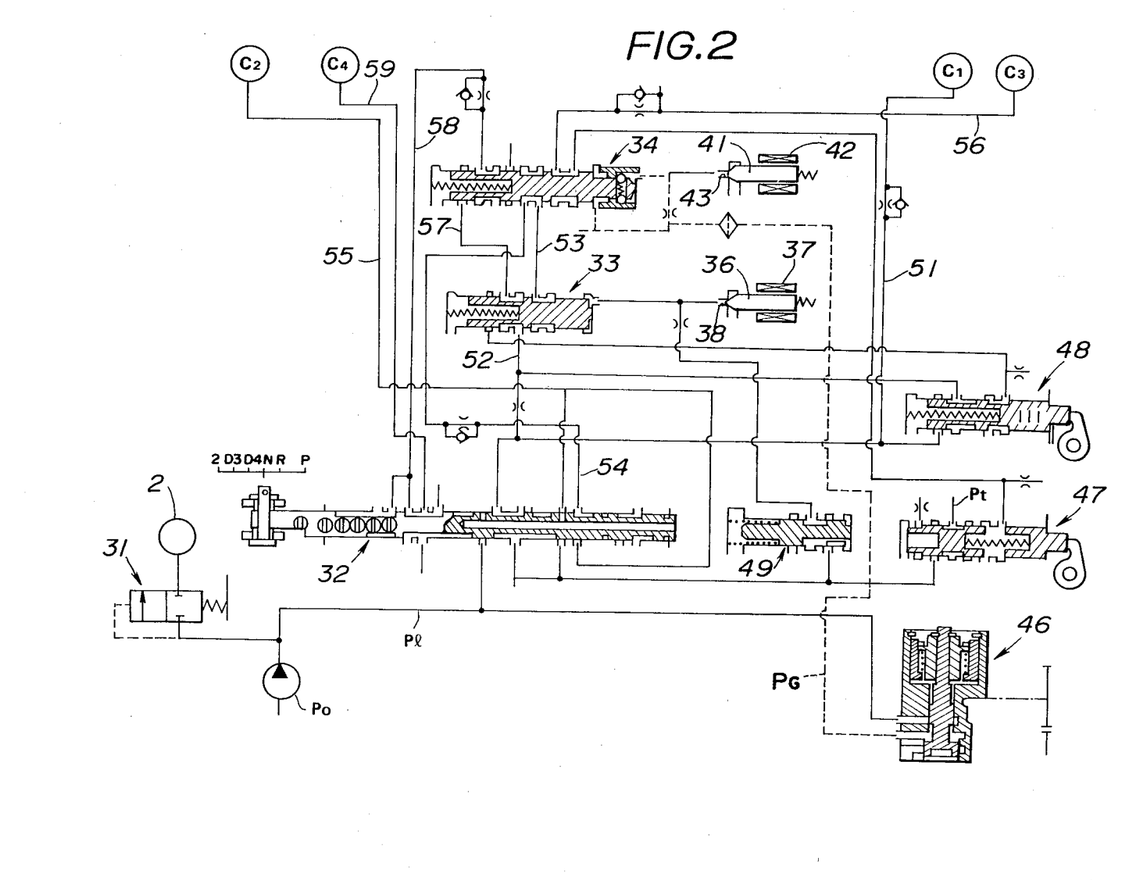
FIG. 2 is a circuit diagram of a hydraulic control circuit for the automatic gear transmission shown in FIG. 1.

A hydraulic control circuit for the torque-converter-type automatic gear transmission thus constructed is shown by way of example in FIG. 2.

A hydraulic line pressure $P_l$ produced by a hydraulic pressure source $P_O$ and regulated by a regulator valve 31 is delivered to a speed selector valve 32 which can be shifted by a speed selector lever (not shown). Six modes, i.e., a parking mode P, a reverse mode R, a neutral mode N, an automatic forward 4-gear mode D4, an automatic forward 3-gear mode D3 (excluding the top gear), and second gear holding mode 2 can be selected one at a time by manually controlling the speed selector valve 32. The speed selector valve 32 is shown as being in the neutral mode position N.

Shift valves 33, 34 are controllable by respective solenoid valves 36, 41 associated therewith and having respective solenoids 37, 42. The solenoids 37, 42 are shown as being de-energized to allow the shift valves 33, 34 to be seated on respective valve seats 38, 43 to close associated oil passages.

The hydraulic control circuit also includes a governor valve 46, a throttle valve 47, a control valve 48, and a pressure reduction valve 49. The governor pressure from the governor valve 46 is denoted at $P_G$, and the throttle pressure from the throttle valve 47 is denoted at $P_t$.

The solenoids 37, 42 are controlled in a pattern given in the following table:

|  | Solenoid 37 | Solenoid 42 |
| --- | --- | --- |
| Low gear | energized | energized |
| 2nd gear | de-energized | energized |
| 3rd gear | de-energized | de-energized |
| Top gear | energized | de-energized |

When the solenoids 37, 42 are energized simultaneously, the hydraulic line pressure $P_l$ is delivered from the speed selector valve 32 through an oil passage 51 to the low clutch $C_1$. The low clutch $C_1$ is then engaged to establish the low gear ratio.

Upon subsequent de-energization of the solenoid 37, the hydraulic line pressure $P_l$ is passed from the speed selector valve 32 via an oil passage 52 to the shift valve 33, then via an oil passage 53 to the shift valve 34, and via an oil passage 54, the speed selector valve 32, and an oil passage 55 to the second clutch $C_2$. The second clutch C2 is now energized to establish the second gear ratio.

When the solenoid 42 is also de-energized, the hydraulic line pressure $P_l$ is delivered from the oil passage 53 through the shift valve 34 and an oil passage 56 to the third clutch $C_3$, which is engaged to establish the third gear ratio.

When the solenoid 37 is energized again, the hydraulic line pressure $P_l$ is led from the shift valve 33 via an oil passage 57 to the shift valve 34, and then via an oil passage 58, the speed selector valve 32, and an oil passage 59 to the top clutch $C_4$. Engagement of the top clutch $C_4$ establishes the top gear ratio.

Figure 3:
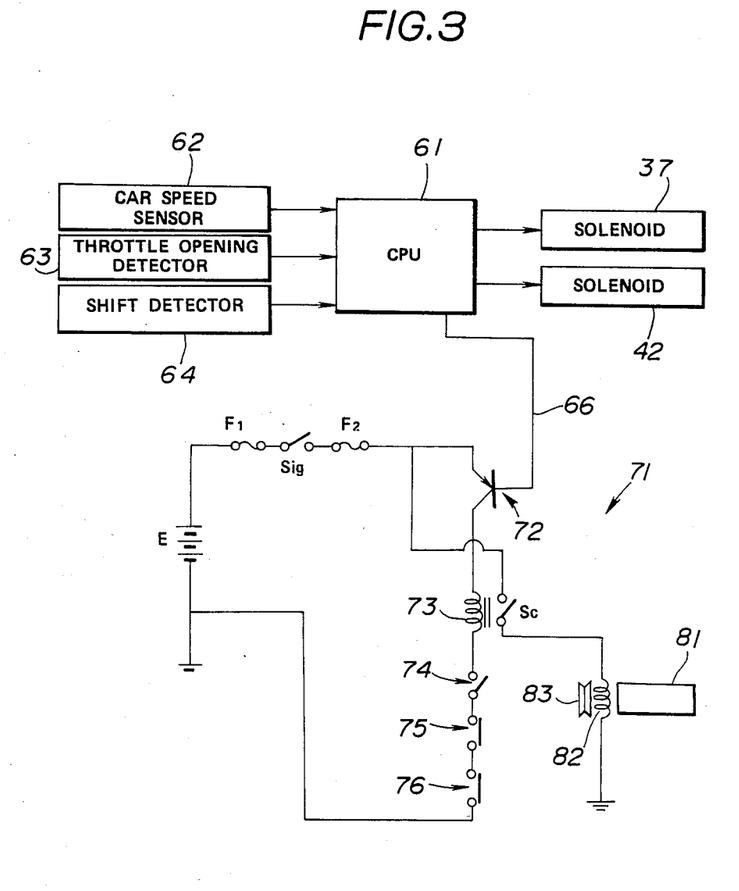
FIG. 3 is a circuit diagram of a control system for an air conditioner.

The solenoids 37, 42 are controlled by an electronic control circuit or central processing unit (CPU) 61 illustrated in FIG. 3. The electronic control circuit 61 is responsive to an electric signal from a car speed sensor 62, which represents a detected car speed, and an electric signal from a throttle opening detector 63, which represents a detected throttle opening, for determining the area in a predetermined speed change map in which the two electric signals are present to control the solenoid valves 36, 41. The electronic control circuit 61 is also supplied with an electric signal from a shift detector 64 for detecting a downshift, i.e., shifting to a lower gear, the shift detector 64 comprising, for example, a detector for detecting the position of the speed selector lever.

Figure 4:
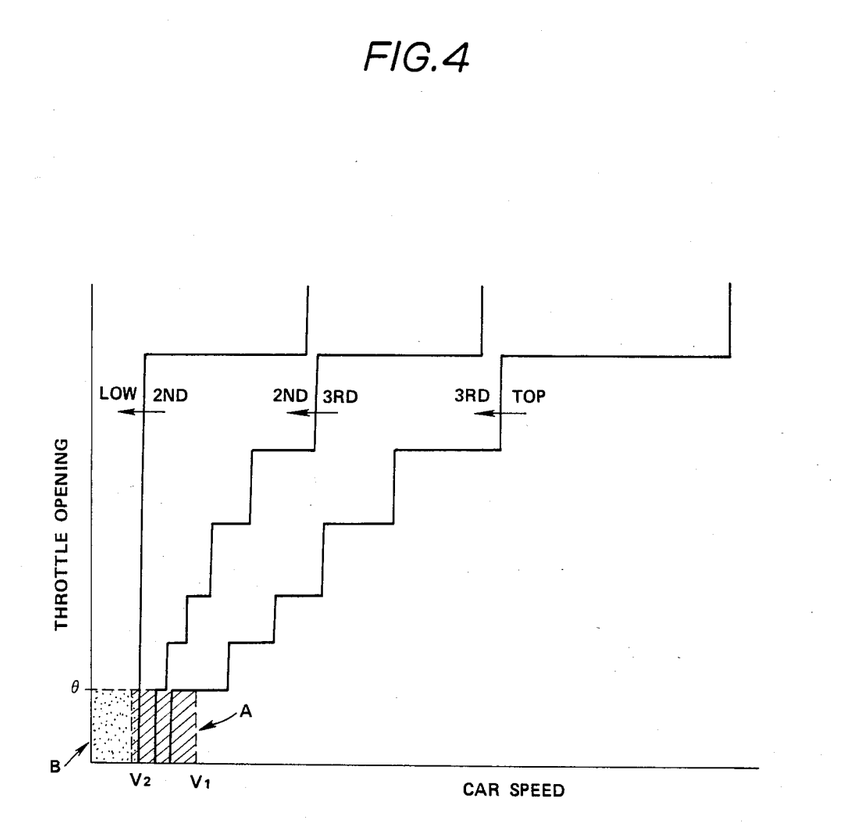
FIG. 4 shows a speed change map.

FIG. 4 illustrates a typical speed change map.

When the engine is idling with the throttle opening $\theta_{TH}$ being smaller than a reference opening $\theta_O$ in the low gear range, the electronic control circuit 61 places the gear transmission is in the neutral position. The region in which a creep prevention device is in operation is indicated by a stippled area B on the speed change map. The gear transmission may be placed in the neutral position when the car speed is lower than a certain extremely low speed, rather than the low gear.

In FIG. 3, the electronic control circuit 61 compares the car speed signal and the engine output (throttle opening) signal with a predetermined compressor operation inhibit map. If these signals are in the inhibit area of the map, the electronic control circuit 61 issues a high-level signal to an output line 66, and if not in the inhibit area, the electronic control circuit 61 issues a low-level signal. This output signal from the electronic control circuit 61 is applied to an air conditioner control circuit 71.

The control circuit 71 which is especially addressed to the control of operation of a compressor 81 of the air conditioner.

The positive terminal of a car battery E is connected via a main fuse $F_1$, an ignition switch Sig, and an air conditioner circuit fuse F2 to one circuit comprising a relay switch Sc and an electromagnetic clutch coil 82 of the compressor 81 which is grounded and to another circuit comprising a PNP transistor 72, a relay switch coil 73, a manual switch 74 for turning on and off the air conditioner, a thermosensitive switch 75, and a pressure-sensitive switch 76 which is grounded. The thermosensitive switch 75 is positioned in the cool-air outlet of the air conditioner and can be closed when the temperature of discharged air is higher than a prescribed temperature. The pressure-sensitive switch 76 is closed when the pressure of a coolant gas in the air conditioner is higher than a prescribed level.

When all of the switches Sig, 74, 75, 76 are closed, the coil 73 is energized to turn on the switch Sc for thereby passing an electric current through the electromagnetic clutch coil 82. The compressor 81 is then driven by a pulley 83 to complete a cooling cycle.

Figure 5:
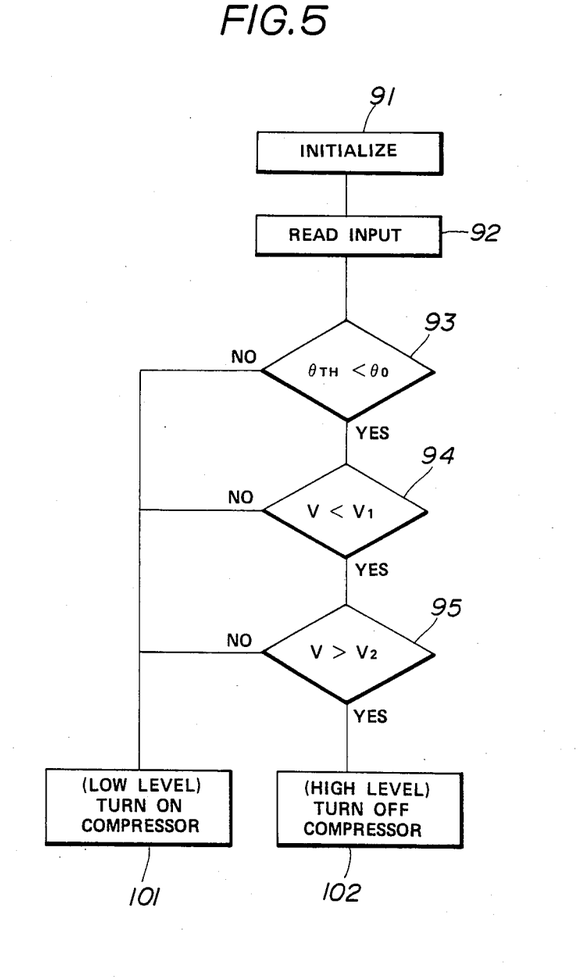
FIG. 5 is a flowchart of an electronic control process according to a first embodiment of the present invention.

FIG. 5 shows a flowchart for the process of determining whether the electronic control circuit 61 should inhibit the operation of the compressor 81 or not.

When the ignition switch is turned on, the power supply is applied to effect initialization at a step 91, and input signals are read at a step 92.

Control then goes to a step 93 which determines whether the present throttle opening $\theta_{TH}$ is lower than the reference opening $\theta_O$ or not. If the present throttle opening $\theta_{TH}$ is lower than the reference opening $\theta_O$, then a low-level signal is applied in a step 101 to turn on the compressor 81. If $\theta_{TH} < \theta_O$, the processing goes to a step 94 which determines whether the car speed V is lower than a first reference car speed $V_1$ or not. If the car speed V is higher than the first reference car speed $V_1$, then the low-level signal is applied to turn on the compressor 81 at the step 101. If $V < V_1$, then the processing proceeds to a step 95 which determines whether the car speed V is higher than a second reference car speed $V_2$ or not. If the car speed V is lower than the second reference car speed $V_2$, then the low-level signal is applied to turn on the compressor 81 at the step 101. If $V > V_2$, a high-level signal is spplied to turn off the compressor 81 in a step 102.

Therefore, the compressor 81 is turned off only when the throttle opening $\theta_{TH}$ is smaller than the reference opening $\theta_O$ and the car speed V is between $V_1$ and $V_2$, and turned on otherwise.

The area in which the compressor operation is inhibited is indicated as a shaded area or zone A in the speed change map of FIG. 4.

Consequently, insofar as the car speed is sufficiently low with the accelerator pedal is in the idling position, operation of the compressor 81 is inhibited to prevent vibration from being produced until right after the gear transmission is shifted down to the low gear at which the creep prevention device operates. When the gear transmission is subsequently in the neutral position in which the creep prevention device operates, the compressor 81 is operated to keep the car air-conditioned.

Figure 6:
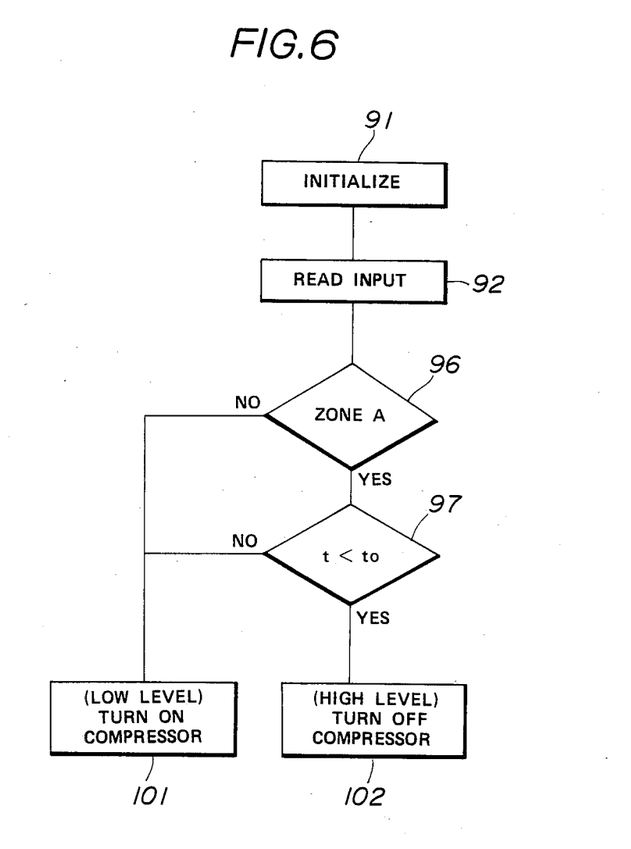
FIG. 6 is a flowchart of an electronic control process according to a second embodiment of the present invention.

A control mode according to the flowchart of FIG. 6 will be described below.

A step 96 determines whether the car speed signal and the engine output signal are in the zone A of the speed change map. If in the zone A, then the time t which has elapsed after these signals have been detected as being in the zone A is measured by a timer, and compared with a reference time $t_o$ in a step 97. If the measured time is shorter than $t_o$, then the compressor 81 is turned off at the step 102, and if the measured time is longer than $t_o$, then the compressor 81 is turned on at a step 101.

Figure 7:
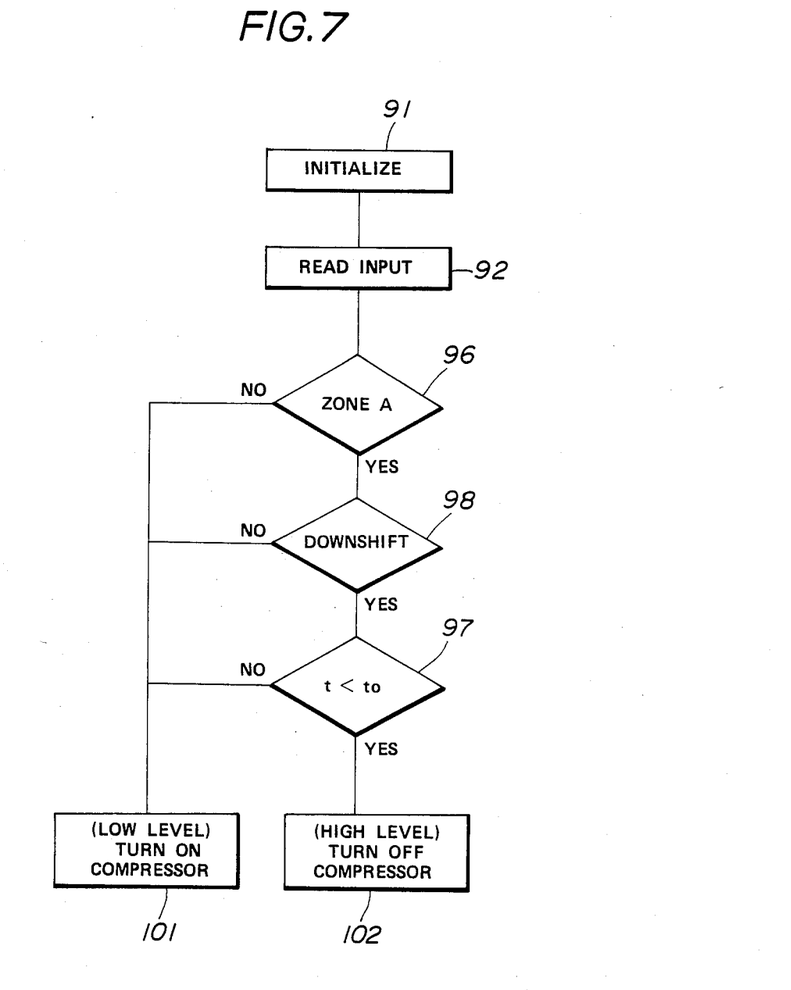
FIG. 7 is a flowchart of an electronic control process according to a third embodiment of the present invention.

Another control mode according to the flowchart of FIG. 7 will be described below.

In this flowchart, if the input signals are in the zone A in the step 96, then control goes to a step 98 which determines whether the signal from the shift detector 64 indicates a downshift or not so as to detect whether the car is being decelerated or not. If the signal from the shift detector 64 is not indicative of a downshift, then the compressor 81 is turned on in the step 101. If the signal indicates a downshift, then the processing proceeds to the step 97 which measures the elapsed time t. If the time t is shorter than the reference time $t_o$, then the compressor 81 is turned off, and if $t > t_o$, then the compressor 81 is turned on.

Therefore, the control system is effective in operating the air compressor only when the car is being decelerated. The reference time may be set to 10 seconds, for example, so that the air conditioner will be prevented from being at rest when the input signals remain in the zone A for a considerable period of time beyond 10 seconds.

The automatic gear transmission in the illustrated embodiment is electronically controlled. However, it may not necessarily be electronically controlled. The accessory to be controlled may be not only a compressor, but also an ACG, a power steering pump, an oil pump, or the like.

According to the present invention, a control system has a control means for comparing an actual running condition of an automobile having an automatic gear transmission having a creep prevention device with a prescribed running condition thereof in which the engine output and the car speed are lower than prescribed levels. If in the prescribed running condition, than an accessory such as an air conditioner compressor is inhibited from operation. The accessory operation may also be inhibited only at the time of a downshift of the gear transmission. The accessory is prevented from being operated to prevent vibration from being produced insofar as the accelerator pedal in in the idling position and the car speed is sufficiently low. The accessory operation may further be inhibited only upon deceleration of the automobile. The accessory can be operated right after the gear transmission has been shifted down to the low gear at which the creep prevention device operates.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A control system for an accessory of an automobile, comprising:
  an engine;
  an engine output detector for detecting the output of said engine;

a gear transmission coupled to said engine and responsive to detection of an idling condition of the automobile for selecting a neutral gear position;

an accessory drivable by the engine;

a clutch disposed between said accessory and said engine for connecting and disconnecting the output of said engine to said accessory;

a speed sensor for detecting the speed of travel of the automobile from said gear transmission; and control means for comparing an actual running condition of the automobile with a prescribed running condition in which the output of the engine and the speed of the automobile are lower than respective prescribed levels; and for inhibiting operation of said accessory by disconnecting said clutch when the automobile is under said prescribed running condition.

2. A control system according to claim 1, wherein said control means inhibits the operation of said accessory by disconnecting said clutch when the speed of the automobile is higher than a second prescribed level and lower than said prescribed level in said prescribed running condition.

3. A control system according to claim 1, wherein said control means includes timer means for connecting said clutch and thus allowing said accessory to operate upon the lapse of a prescribed period of time after the automobile has entered said prescribed running condition.

4. A control system according to claim 1, wherein said control means is arranged to inhibit operation of said accessory by only disconnecting said clutch at the time of a downshift of said gear transmission and reconnecting said clutch immediately after said downshift.

* * * * *